(12) United States Patent
Westbrook et al.

(10) Patent No.: US 6,832,261 B1
(45) Date of Patent: Dec. 14, 2004

(54) METHOD AND APPARATUS FOR DISTRIBUTED RESEQUENCING AND REASSEMBLY OF SUBDIVIDED PACKETS

(75) Inventors: Gregg Anthony Westbrook, San Jose, CA (US); Thomas Dejanovic, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 861 days.

(21) Appl. No.: 09/776,792

(22) Filed: Feb. 4, 2001

(51) Int. Cl.[7] .............................................. G06F 15/16
(52) U.S. Cl. ...................... 709/236; 709/249; 709/250; 370/394; 370/400; 370/474
(58) Field of Search ................................ 709/231, 236, 709/249, 250; 370/394, 395.72, 396, 400, 474

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,260 A | 12/1986 | Toy et al. | |
| 4,734,907 A | 3/1988 | Turner | |
| 4,829,227 A | 5/1989 | Turner | |
| 4,849,968 A | 7/1989 | Turner | |
| 4,893,304 A | 1/1990 | Giacopelli et al. | |
| 4,901,309 A | 2/1990 | Turner | |
| 5,127,000 A | 6/1992 | Henrion | |
| 5,173,897 A | 12/1992 | Schrodi et al. | |
| 5,179,551 A | 1/1993 | Turner | |
| 5,179,556 A | 1/1993 | Turner | |
| 5,229,991 A | 7/1993 | Turner | |
| 5,253,251 A | 10/1993 | Aramaki | |
| 5,260,935 A | 11/1993 | Turner | |
| 5,337,308 A | 8/1994 | Fan | 370/388 |

(List continued on next page.)

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS–96–07, Washington University, St. Louis, MO, 20 pages.

Turner et al., "System Architecture Document for Gigabit Switching Technology," Aug. 27, 1998, Ver. 3.5, ARL–94–11, Washington University, St. Louis, MO, 110 pages.

*Primary Examiner*—Hosain Alam
*Assistant Examiner*—David Lazaro
(74) *Attorney, Agent, or Firm*—The Law Office of Kirk D. Williams

(57) ABSTRACT

Methods and apparatus are disclosed for distributed resequencing and distributed reassembly of large packets split into smaller packets with each packet typically marked with a sequence number, timestamp, or other ordering and reassembly indications, and distributed among different paths and arriving possibly out of their original sequence. Multiple resequencing components communicated information as to received packets and coordinate the sending of packets from themselves, typically to produce a stream of resequenced packets which is then distributed to multiple reassembly components, which communicate information as to received packets and coordinate the sending of packets from themselves so as to produce the reassembled larger packets. When all packets comprising a larger packet are received by one of the distributed resequencing components, the reassembly components transmit their packets typically over a common bus or link in a coordinated fashion as to produce the original larger packet.

30 Claims, 20 Drawing Sheets

U.S. PATENT DOCUMENTS

| | | |
|---|---|---|
| 5,339,311 A | 8/1994 | Turner |
| 5,402,415 A | 3/1995 | Turner |
| 5,414,705 A | 5/1995 | Therasse et al. ............. 370/352 |
| 5,483,523 A | 1/1996 | Nederlof ..................... 370/394 |
| 5,491,728 A | 2/1996 | Verhille et al. ............. 375/362 |
| 5,548,593 A | 8/1996 | Peschi ........................ 370/394 |
| 5,570,348 A | 10/1996 | Holden ....................... 370/236 |
| 5,721,820 A | 2/1998 | Abali et al. ................. 709/243 |
| 5,784,357 A | 7/1998 | Wolker et al. ............... 370/218 |
| 5,809,024 A | 9/1998 | Ferguson et al. ........... 370/474 |
| 5,842,040 A | 11/1998 | Hughes et al. |
| 6,011,779 A | 1/2000 | Wills .......................... 370/236 |
| 6,076,117 A | 6/2000 | Billings ...................... 709/253 |
| 6,160,651 A | 12/2000 | Chang et al. ............... 370/352 |
| 6,735,219 B1 | 5/2004 | Clauberg .................... 370/474 |
| 6,744,741 B1 | 6/2004 | Ju et al. ...................... 370/264 |
| 2002/0091844 A1 | 7/2002 | Craft et al. ................. 709/230 |

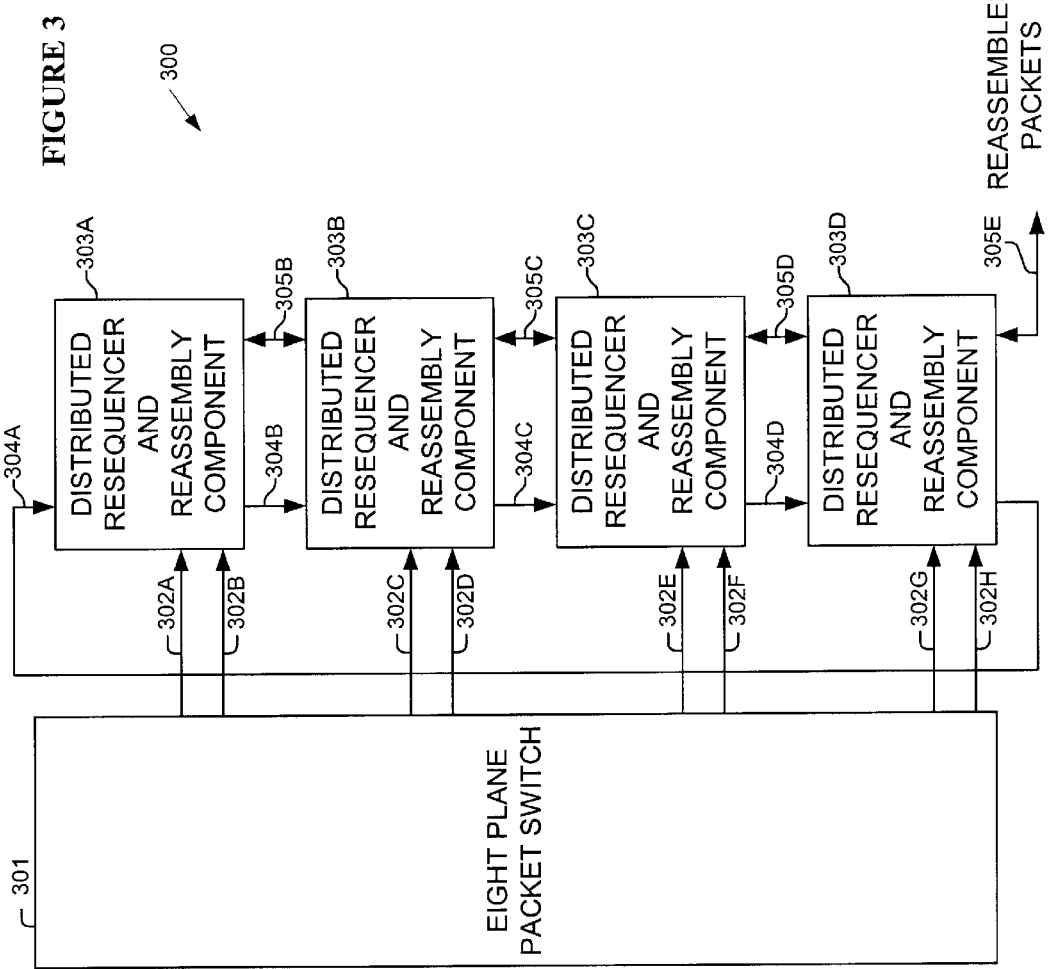

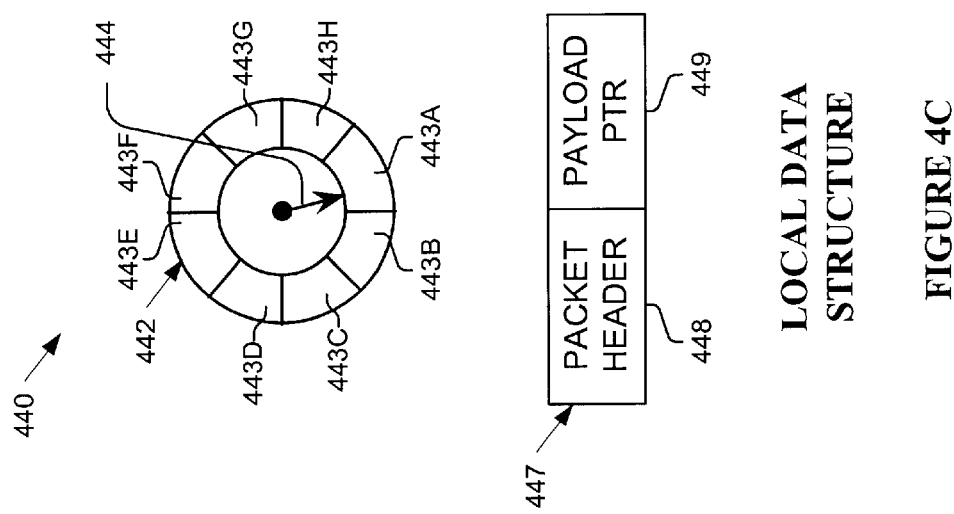

GLOBAL DATA STRUCTURE

PACKET RESEQUENCER

PACKET REASSEMBLER

PACKET MEMORY MANAGER

QUEUE MANAGER

METHOD AND APPARATUS FOR DISTRIBUTED RESEQUENCING AND REASSEMBLY OF SUBDIVIDED PACKETS

FIELD OF THE INVENTION

This invention relates to computer and networking architectures and systems, including packet switching systems, routers, computers and other devices; and more particularly, the invention relates to distributed resequencing and reassembly of subdivided packets using multiple resequencing and reassembly components.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Consumers and designers of these systems typically desire high reliability and increased performance at a reasonable price. A commonly used technique for helping to achieve these goals is for these systems to provide multiple paths between a source and a destination. Packets of information are then dynamically routed and distributed among these multiple paths. It is typically more cost-effective and technically feasible to provide multiple slower rate links or switching paths, than to provide a single higher rate path. Such designs also achieve other desired performance characteristics.

When packets from a single stream are sent through such a packet switching system, they may arrive out of order at their destinations, such as an output port of a packet switching system. In this situation, the packets must be re-ordered. Similarly, when a packet is decomposed into multiple packets which are sent to a destination, the packet must be reassembled. In some systems, one or both resequencing and/or reassembly of packets might be required. The increasing rates of traffic to be sent through a packet switching system and the corresponding number of packets which must be resequenced and/or reassembled is resulting in higher demands on the resequencing and reassembly processes. In other words, the resequencing and/or reassembly processes must be performed at corresponding higher rates. However, it is not always possible for traditional methods and mechanisms to operate at these higher rates. For example, a traditional resequencing and/or reassembly mechanism might be limited by the bandwidth of memory used in the resequencing and/or reassembly processes. New methods and apparatus are needed to resequence and/or reassemble packets, including, but not limited to those systems that can operate more efficiently and/or at fast operating rates.

SUMMARY OF THE INVENTION

A system is disclosed for resequencing and reassembling of a stream of packets. One embodiment includes multiple distributed resequencing and reassembly components. Each of the multiple distributed resequencing and reassembly components include one or more data structures for maintaining an indication of packets of the stream of packets that are stored in other distributed resequencing and reassembly components. Each of the plurality of distributed resequencing and reassembly components includes a resequencing mechanism for resequencing a subset of the stream of packets received by said each of the plurality of distributed resequencing and reassembly components. A communications mechanism is coupled to the distributed resequencing and reassembly components to allow communication among them. One or more packet merging mechanisms are coupled to the distributed resequencing and reassembly components to receive packets of the stream of packets to produce a resequenced and reassembled stream of the stream of packets.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 3 is a block diagram illustrating an exemplary distributed system using four resequencing and reassembly elements;

FIGS. 4C–D illustrate data structures used in resequencing packets in one embodiment;

DETAILED DESCRIPTION

Figure 1A:
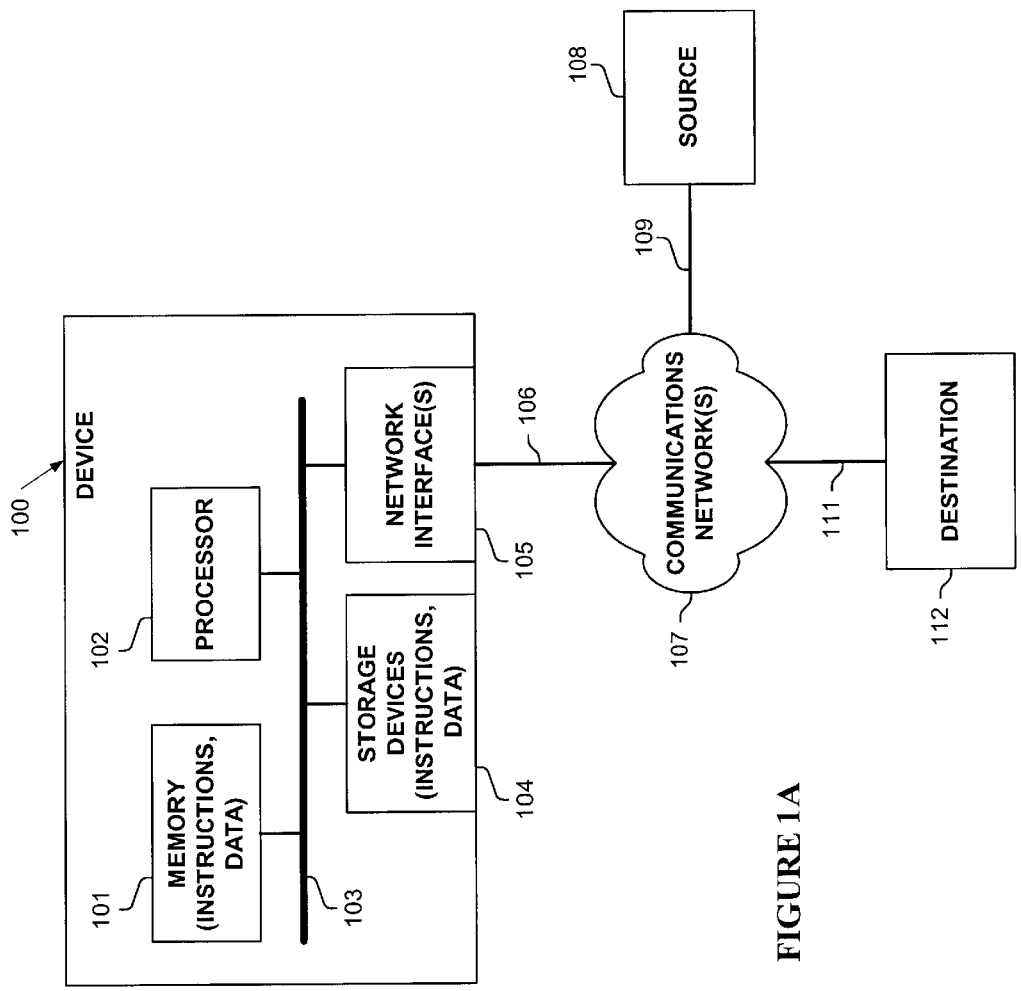
FIGS. 1A–D are block diagrams of an exemplary several of many possible embodiments of communications and computer systems resequencing and/or reassembling packets according to the invention.

Methods and apparatus are disclosed for (a) distributed resequencing, (b) distributed reassembly and (c) distributed resequencing and reassembly of packets in a computer or communications system, including, but not limited to packet switching systems, routers, networking devices, computers, etc. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to systems, sub-systems, components, boards, cards, integrated circuit chips, embedded processors, ASICs, methods, computer-readable medium containing instructions, and any other apparatus or method embodying the invention as recited by the claims. The embodiments described hereinafter embody various aspects and configurations within the scope and spirit of the invention.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switching systems, and networks, computer and/or communication devices or mechanisms, or combinations thereof. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

Methods and apparatus are disclosed for (a) distributed resequencing, (b) distributed reassembly and (c) distributed resequencing and reassembly of packets in a computer or communications system. For clarity of description purposes, embodiments may be described in terms of acting on a single stream of packets, while it is understood that embodiments are not so limited, and embodiments typically sequentially and/or concurrently resequence and/or reassemble numerous streams of packets. For example, some embodiments may use different packet streams to represent different types, priorities, or classes of service.

Distributed Resequencing of Packets

Methods and apparatus are disclosed for distributed resequencing of packets belonging to an original stream of packets in a computer or communications system, such as in a packet switching or other communications or computer system. Typically, packets of the original stream are marked with a sequence number, timestamp, or other ordering indication, and distributed among and sent over several different paths through a system or across network with these packets arriving at a location possibly out of their original sequence. These packets are received at the location by multiple resequencing components which communicate and coordinate actions among themselves. The resequencing components distribute information as to received packets and coordinate the sending of packets from themselves so as to produce a stream of resequenced packets. In one embodiment, each of the multiple resequencing components maintains one or more data structures indicating packets stored locally and those packets stored anywhere (or elsewhere) within the multiple resequencing components. When a next packet in the original sequence has been received, the packet is sent out. In this manner, these multiple resequencing components coordinate the timing of multiplexing the actual packets over an output link so as to regenerate the packets according to their original ordering.

Distributed Reassembly of Packets

Methods and apparatus are disclosed for distributed reassembly by a computer or communications system of large packets split into smaller packets typically for transport through an network or communications system, such as in a packet switching system. For example, TCP/IP and Ethernet packets are much larger than the 53 byte asynchronous transfer mode ("ATM") packets which are increasingly becoming a fundamental transportable unit through communications networks and systems. Therefore, these larger packets are split into several smaller packets at a source point. Typically, these smaller packets are marked with a sequence number, timestamp, and other ordering and reassembly indications, and sent through a system or across network with these smaller packets arriving at a destination location. These smaller packets are received at the destination location by multiple reassembly components which communicate and coordinate actions among themselves. If the smaller packets are received out of their original sequence order, some mechanism is typically used to resequence (a) the received packets at the destination location, or (b) each subset of the packets received by one of the distributed reassembly components at the destination location. The reassembly components distribute information as to received packets and coordinate the sending of packets from themselves so as to produce the reassembled larger packets. In one embodiment, each of the multiple reassembly components maintains one or more data structures indicating packets stored locally and those packets stored anywhere (or elsewhere) within the multiple reassembly components. When all smaller packets comprising a larger packet are received by one of the distributed resequencing components, the reassembly components transmit their smaller packets typically over a common bus or link in a coordinated fashion as to produce the original larger packet.

Distributed Resequencing and Distributed Reassembly of Packets

Methods and apparatus are disclosed for distributed resequencing of one or more original packet streams and distributed reassembly by a computer or communications system of large packets split into smaller packets typically for transport through an network or communications system, such as in a packet switching system. For example, TCP/IP and Ethernet packets are much larger than the 53 byte asynchronous transfer mode ("ATM") packets which are increasingly becoming a fundamental transportable unit through communications networks and systems. Therefore, these larger packets are split into several smaller packets at a source point. Typically, these packets are marked with a sequence number, timestamp, and other ordering and reassembly indications, and distributed among and sent over several different paths through a system or across network with these packets arriving at a location possibly out of their original sequence. These packets are received at the location by multiple resequencing components which communicate and coordinate actions among themselves. The resequencing components distribute information as to received packets and coordinate the sending of packets from themselves so as to produce either a single stream of resequenced packets which is then distributed to multiple reassembly components or several ordered streams of packets, typically one for each distributed reassembly component. In one embodiment, each of the multiple resequencing components maintains one or more data structures indicating packets stored locally and those packets stored anywhere (or elsewhere) within the multiple resequencing components. When a next packet in the original sequence has been received, the packet forwarded to a distributed reassembly component. In this manner, these multiple resequencing components can coordinate their resequencing activities to collectively know when a particular packet may be forwarded to a distributed reassembly component. The packets are then received at the destination location by multiple reassembly components which communicate and coordinate actions among themselves. The reassembly components distribute information as to received packets and coordinate the sending of packets from themselves so as to produce the reassembled larger packets. In one embodiment, each of the multiple reassembly components maintains one or more data structures indicating packets stored locally and those packets stored anywhere (or elsewhere) within the multiple reassembly components. When all packets comprising a larger packet are received by one of the distributed resequencing components, the reassembly components transmit their packets typically over a common bus or link in a coordinated fashion as to produce the original larger packet.

Details of Exemplary Embodiments

Figure 1B:
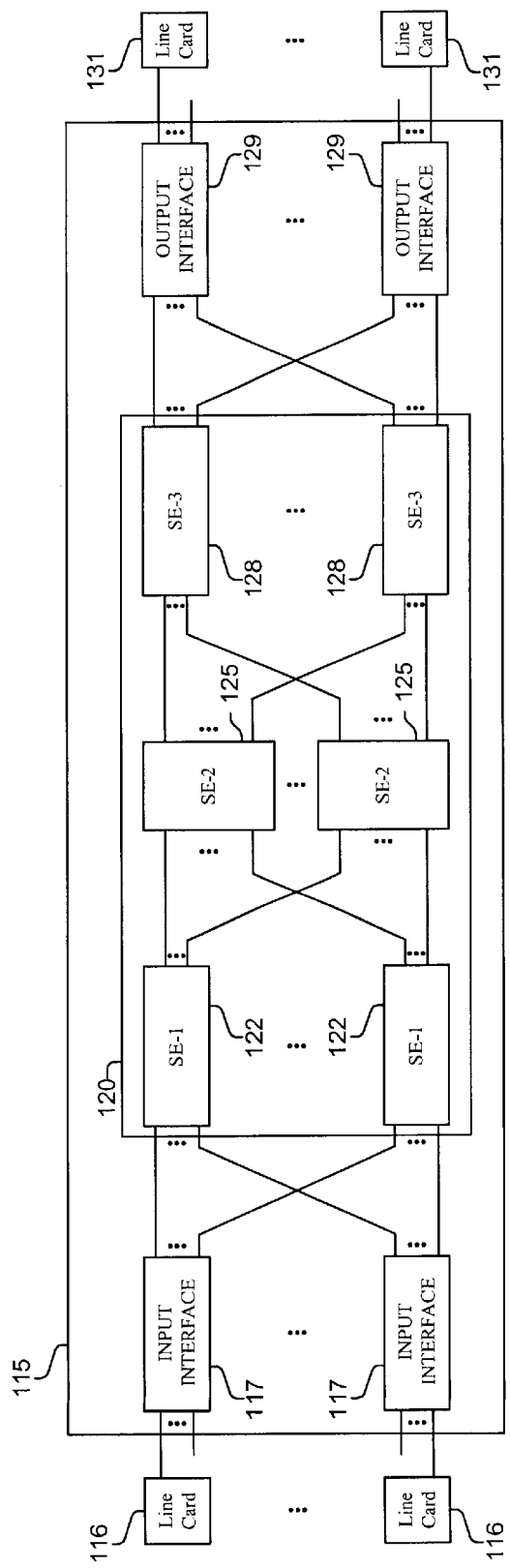
Figure 1C:
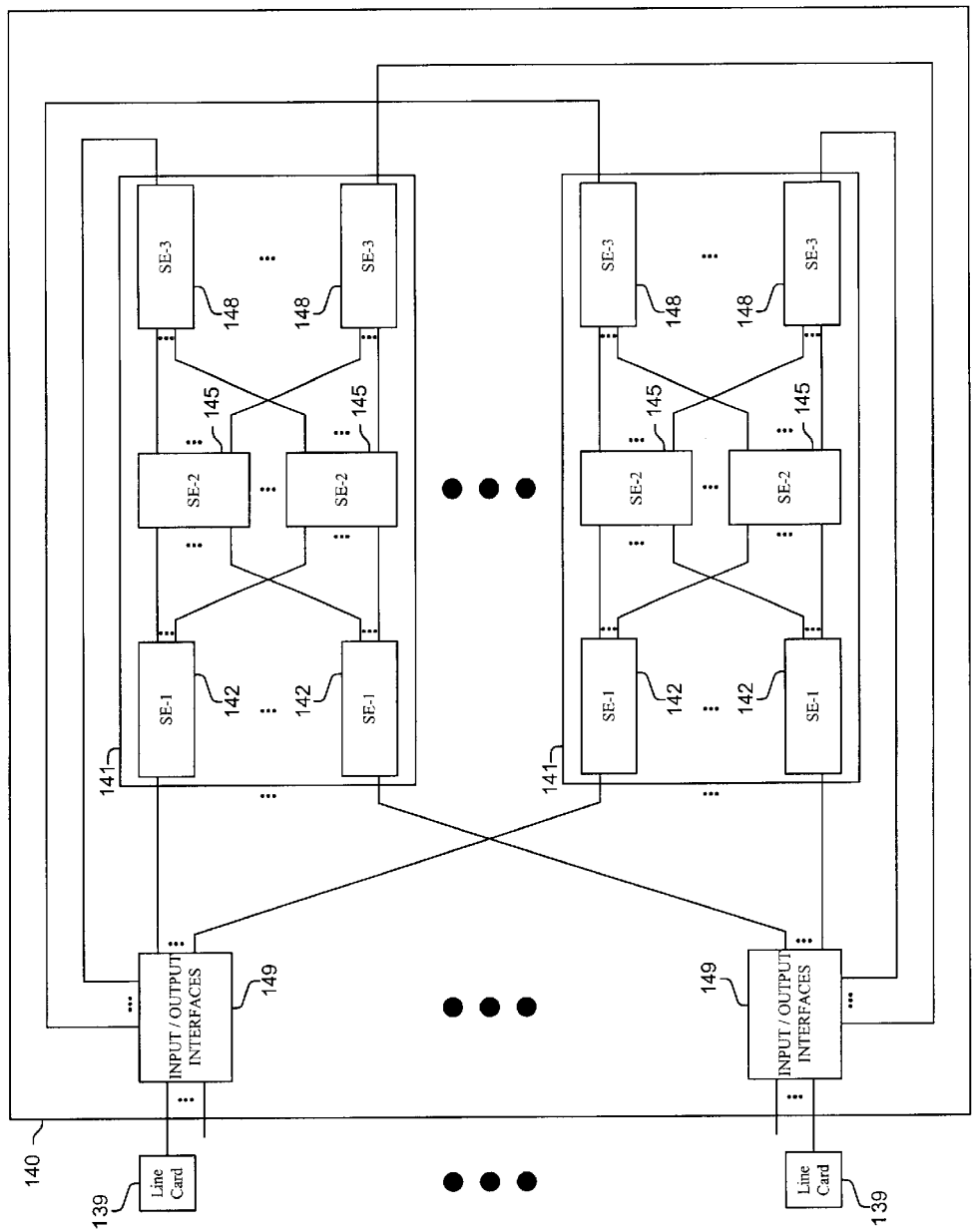
Figure 1D:
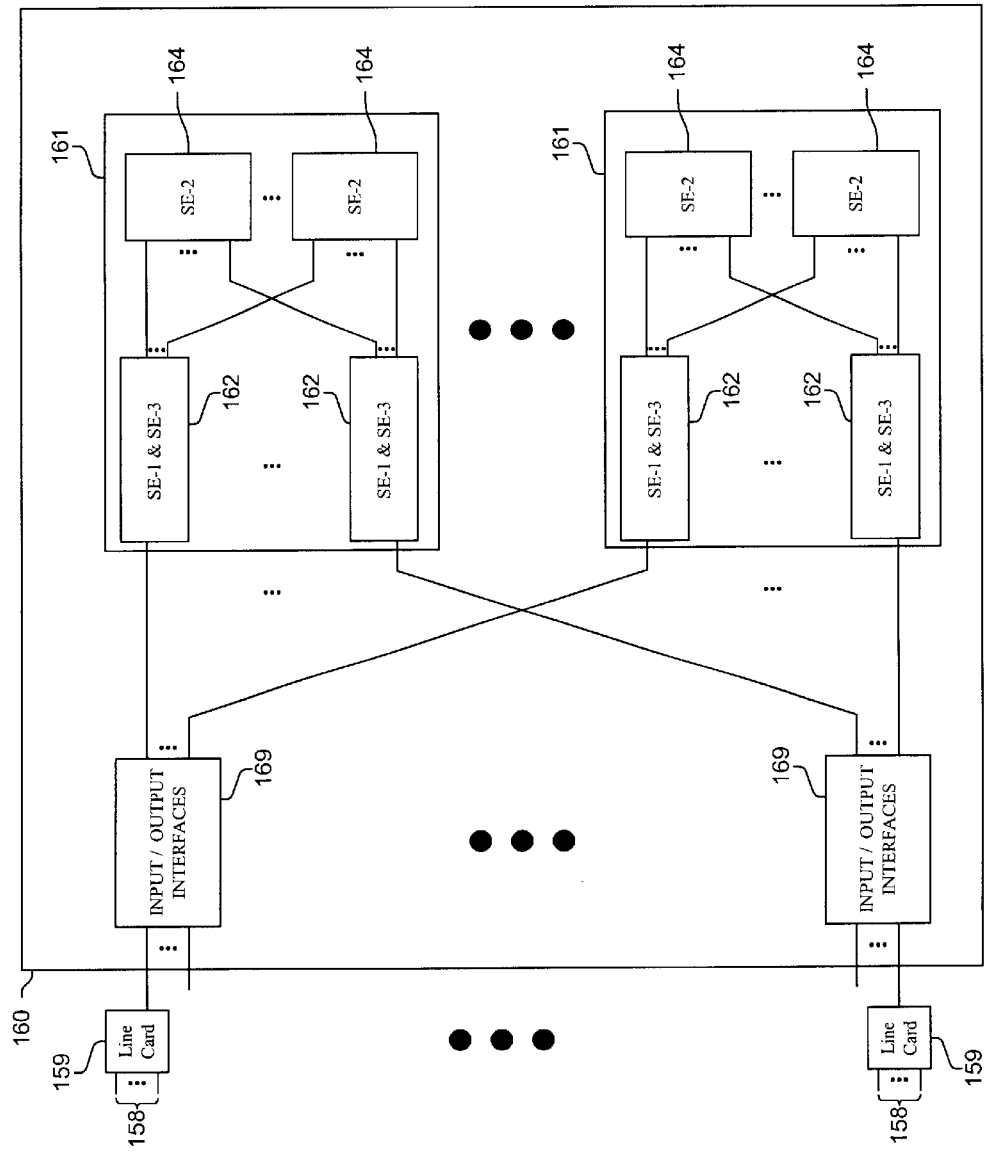

FIGS. 1A–1D and their discussion herein are intended to provide a description of various exemplary embodiments and operating environments in which the invention may be practiced. FIG. 1A illustrates an embodiment including a computer system resequencing and/or reassembling packets according to the invention. FIGS. 1B–D illustrate embodiments including various packet switching systems resequencing and/or reassembling packets according to the invention.

FIG. 1A illustrates a block diagram of one embodiment of a device 100 with resequences or reassembles a received one or more streams of packets. Embodiments of device 100 include a routers, computer systems, other communications devices, etc., or components thereof. As shown, device 100 includes processor and/or control logic 102 (hereinafter "processor"), memory 101, storage devices 104, network interface(s) 105, and one or more internal communications mechanisms 103 (shown as a bus for illustrative purposes). In one embodiment, processor 102 controls the operations of device 100 to resequence and/or reassemble packets according to the invention. Memory 101 is one type of computer-readable medium, and typically comprises random access memory (RAM), read only memory (ROM), integrated circuits, and/or other memory components. Memory 101 typically stores computer-executable instructions to be executed by processor 102 and/or data which is manipulated by processor 102 for implementing resequencing and/or reassembly functionality in accordance with the invention. Storage devices 104 are another type of computer-readable medium, and typically comprise disk drives, diskettes, networked services, tape drives, and other storage devices. Storage devices 104 typically store computer-executable instructions to be executed by processor 102 and/or data which is manipulated by processor 102 for implementing resequencing and/or reassembly functionality in accordance with the invention.

In one embodiment, device 100 operates as a router, bridge, switch or other communications device attached to a communications network 107. Packets sent from source 108 over link 109 to communications network 107 are relayed over one or more links 106 to device 100. Device 100 receives the packets, internally routes and resequences and/or reassembles the packets according to the invention. In one embodiment, device 100 consumes the resequenced and/or reassembled stream of packets. In one embodiment, device 100 sends the resequenced and/or reassembled stream of packets out one or more links 106 to destination 112, which receives these packets from communications network 107 over link 111.

In one embodiment, device 100 operates as a computer or communications system which receives from source 108 an out of order stream of packets and/or disassembled stream of packets. Device 100 receives the packets and resequences and/or reassembles the packets according to the invention. In one embodiment, device 100 consumes the resequenced and/or reassembled stream of packets. In one embodiment, device 100 sends the resequenced and/or reassembled stream of packets out to destination 112.

FIGS. 1B–D illustrate the basic topology of different exemplary packet switching systems resequencing and/or reassembling packets according to the invention. FIG. 1B illustrates an exemplary packet switch 115 having multiple inputs and outputs and a single interconnection network 120. FIG. 1C illustrates an exemplary packet switch 140 having multiple interconnection networks 141 and folded input and output interfaces 149. FIG. 1D illustrates an exemplary folded packet switch 160 having multiple interconnection networks 161 and folded input and output interfaces 169. Embodiments of each of these packet switches 115, 140 and 160 resequencing and/or reassembling packets according to the invention in the manners disclosed herein along with all possible embodiments within the doctrine of equivalents. Of course, the invention is not limited to these illustrated operating environments and embodiments, and the packet switching systems may have more or less elements.

FIG. 1B illustrates an exemplary embodiment of a packet switch 115. Packet switch 115 comprises multiple input interfaces 117, interconnection network 120, and output interfaces 129. Input interfaces 117 and output interfaces 129 are both coupled over multiple links to interconnection network 120. Line cards 116 and 131 are coupled to input interfaces 117 and output interfaces 131. In some embodiments including other packet switching topologies, line cards or their functionality may be included in the packet switch itself, or as part of the packet switching system.

In one embodiment, interconnection network 120 comprises multiple switch elements SE-1 122, SE-2 125, and SE-3 128 that are interconnected by multiple links. Line cards 116 and 131 may connect to other systems (not shown) to provide data items (e.g., packets) to be routed by packet switch 115. Although resequencing and reassembly of packets can be accomplished in other components in accordance with the invention, typically packets are resequenced and/or reassembled in output interfaces 129.

FIG. 1C illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Although resequencing and reassembly of packets can be accomplished in other components in accordance with the invention, typically packets are resequenced and/or reassembled in input/output interfaces 149.

FIG. 1D illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Although resequencing and reassembly of packets can be accomplished in other components in accordance with the invention, typically packets are resequenced and/or reassembled in input/output interfaces 169.

Figure 2A:
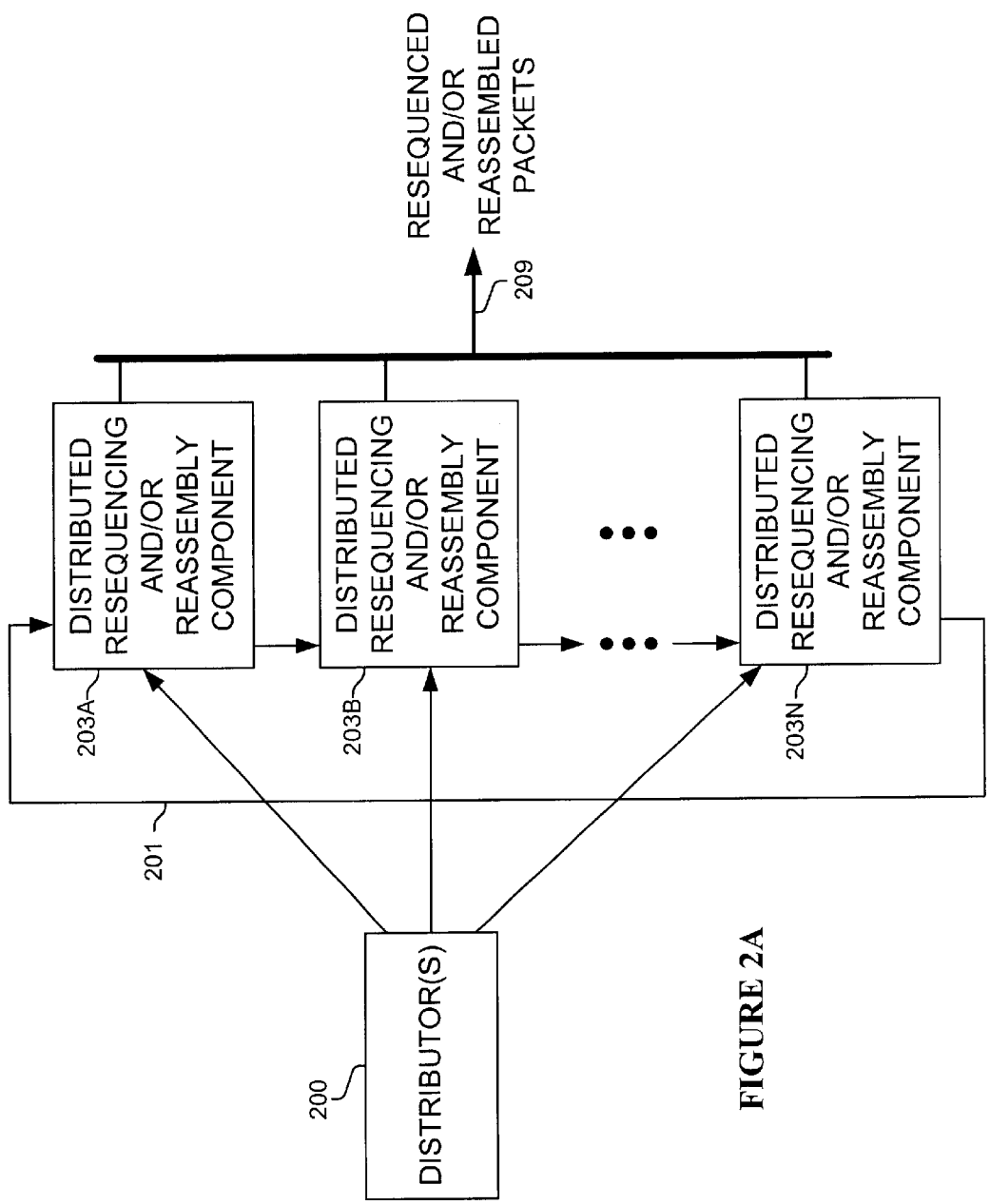
FIG. 2A is a block diagram of an exemplary embodiment of a distributed resequencing and/or reassembly system.

FIG. 2A illustrates the operation of one embodiment having N distributed resequencing and/or reassembly components 203A–N. These components 203A–N are labeled "distributed resequencing and/or reassembly components" to emphasize that embodiments of the invention (a) only resequence packets, (b) only reassemble packets, and (c) both resequence and reassemble packets. For simplicity of understanding, other embodiments might be described herein in relation to only some of these three possibilities, while it is understood that the teachings described herein apply to all three configurations whether explicitly stated or not.

Moreover, these distributed resequencing and/or reassembly components 203A–N may resequence and/or reassemble a single stream of packets, or typically in a large system simultaneously resequence and/or reassemble one or more streams of packets. For example, one embodiment of a system having i inputs, o outputs, p priority levels and costs c resequences and/or reassembles i*o*p*c streams of packets. Other embodiments may resequence a different number of streams simultaneously or sequentially in keeping within the scope and spirit of the invention. For simplicity of understanding to the reader, the process of resequencing and/or reassembling a single stream may be described herein, with the teachings understood to be applicable to simultaneously resequence and/or reassemble one or more streams of packets.

As shown in FIG. 2A, each of one or more distributors 200 (e.g., distribution components, networks, packet switching systems, etc.) send packets belonging to one or more streams of packets or to one or more larger packets to the distributed resequencing and/or reassembly components 203A–N. In one embodiment, packets are distributed to all distributed resequencing and/or reassembly components 203A–N, while in another embodiment, packets are distributed to only a subset of the distributed resequencing and/or reassembly components 203A–N.

Distributed resequencing and/or reassembly components 203A–N communicate over a communications mechanism 201 shown as a ring. Although, communications mechanism 201 could be any means of communications among distributed resequencing and/or reassembly components 203A–N, including, but not limited to a bus, ring, fully-connected network, shared memory, message passing, etc. Distributed resequencing and/or reassembly components 203A–N coordinate the resequencing and/or reassembly process(es) typically by sharing information as to what packets are currently held by each of the distributed resequencing and/or reassembly components 203A–N, and coordinating the sending of packets over a packet merge bus 209 (or other communications mechanism) to produce one or more streams of resequenced and/or reassembled packets.

Figure 2B:
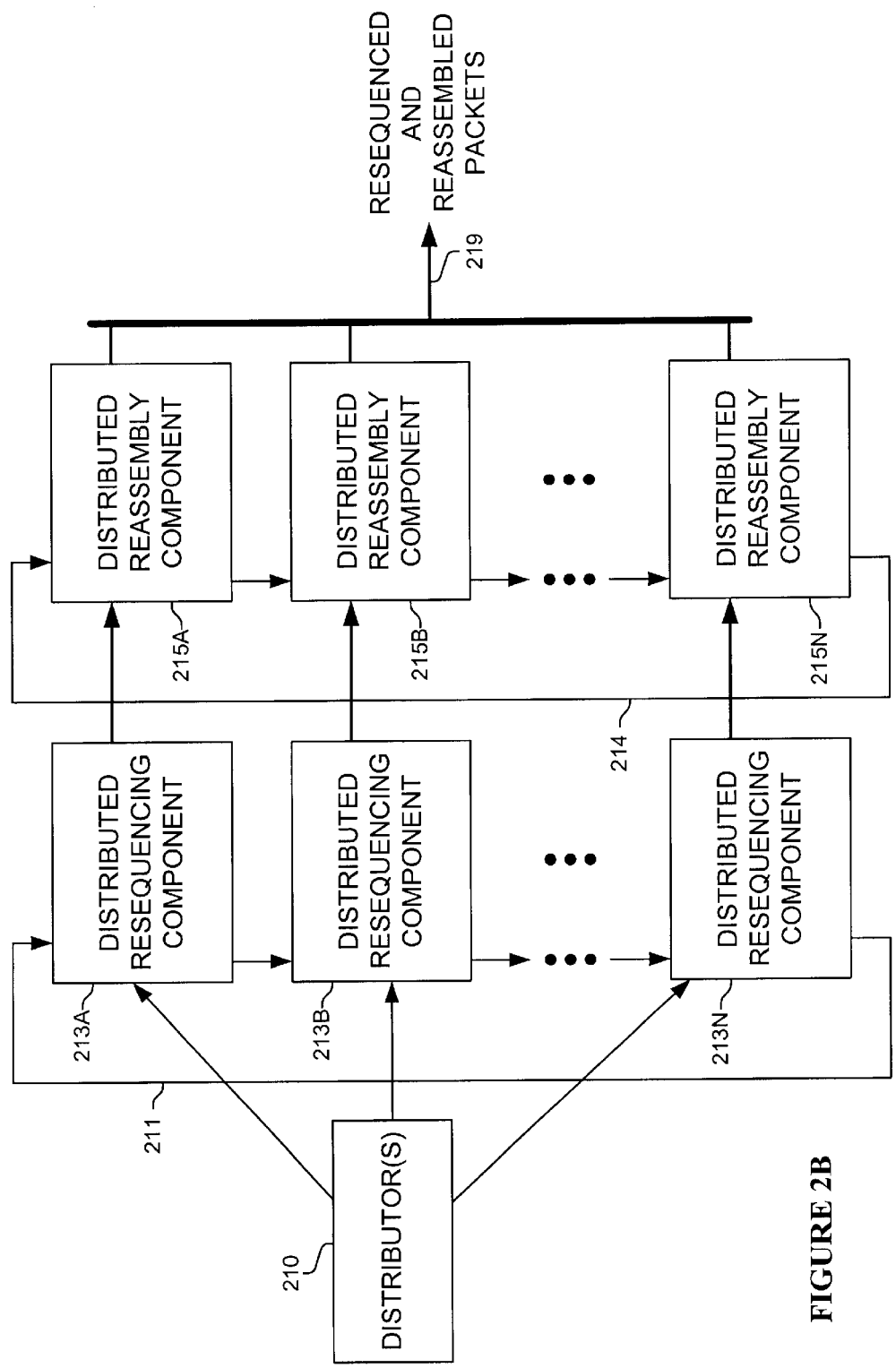
FIG. 2B is a block diagram of an exemplary embodiment of a resequencing and reassembly system using a distributed resequencing stage and a distributed reassembly stage.

FIG. 2B illustrates the operation of one embodiment having a distributed resequencing stage followed by a distributed reassembly stage. As shown in the illustrated embodiment, one or more distributors 210 distribute packets belonging to one or more streams of packets. Some or all of these packets may be broken into a plurality of subdivided packets. Packets are typically subdivided for transportation across a communications system that supports smaller packet sizes. These packets are received by the resequencing stage including N distributed resequencing components 213A–N, which individually resequence packets received within a particular distributed resequencing component 213A–N and collectively resequence all the packets by communicating information as to packets and/or sequencing information (e.g., indications of timestamps, sequence numbers, etc.) of packets received among themselves. In this manner, a particular distributed resequencing component 213A–N gains the information necessary to determine whether a packet may be immediately forwarded or whether it must wait for more packets to be received by the distributed resequencing stage. This information includes whether one of the distributed resequencing components 213A–N has received the requisite predecessor packets in the predetermined packet sequence or other resequencing indication. In one embodiment, each of the distributed resequencing components 213A–N maintains one or more data structures indicating packets stored locally and those packets stored in any or another distributed resequencing component 213A–N. When a next packet in the original sequence has been received, the packet is forwarded to the distributed reassembly stage.

Packets are received by the distributed reassembly stage, which includes N distributed reassembly components 215A–N, which coordinate with other distributed reassembly components 215A–N to collectively reassemble subdivided packets. Distributed reassembly components 215A–N communicate information as to the subdivided packets which are stored by one of the distributed reassembly components 215A–N. In one embodiment, each of the distributed reassembly components 215A–N maintains one or more data structures indicating subdivided packets stored locally and those subdivided packets stored in another or any distributed reassembly components. When all the subdivided packets comprising a larger packet are received by one of the distributed reassembly components 215A–N, then, in a coordinated fashion, these subdivided packets are sent out communications link 219 to produce the reassembled larger packet (along with other resequenced and reassembled packets). In one embodiment, the distributed reassembly component 215A–N having a first in sequence of the subdivided packets comprising the larger packet initiates a de-queue operation to cause the distributed reassembly components 215A–N containing one of the pertinent subdivided packets to forward it on communications link 219 at the appropriate time to reassemble the larger packet.

Figure 2C:
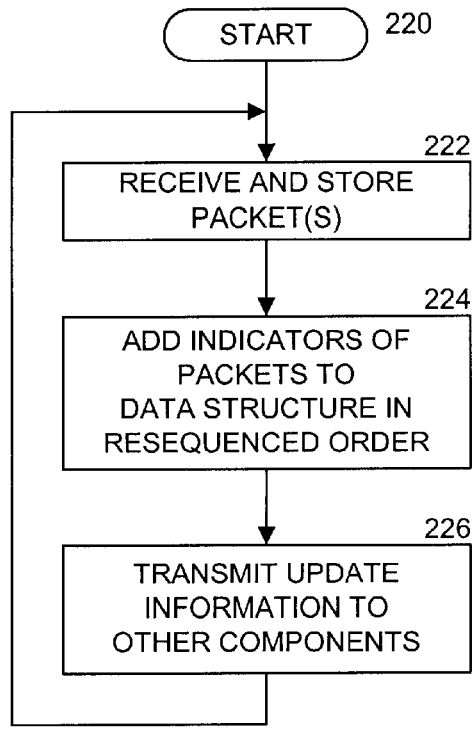
FIGS. 2C–2H are flow diagrams illustrating processes for distributed resequencing and reassembly of packets.
Figure 2D:
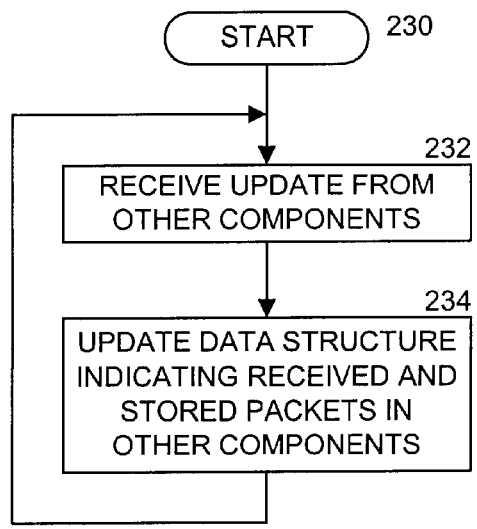
Figure 2E:
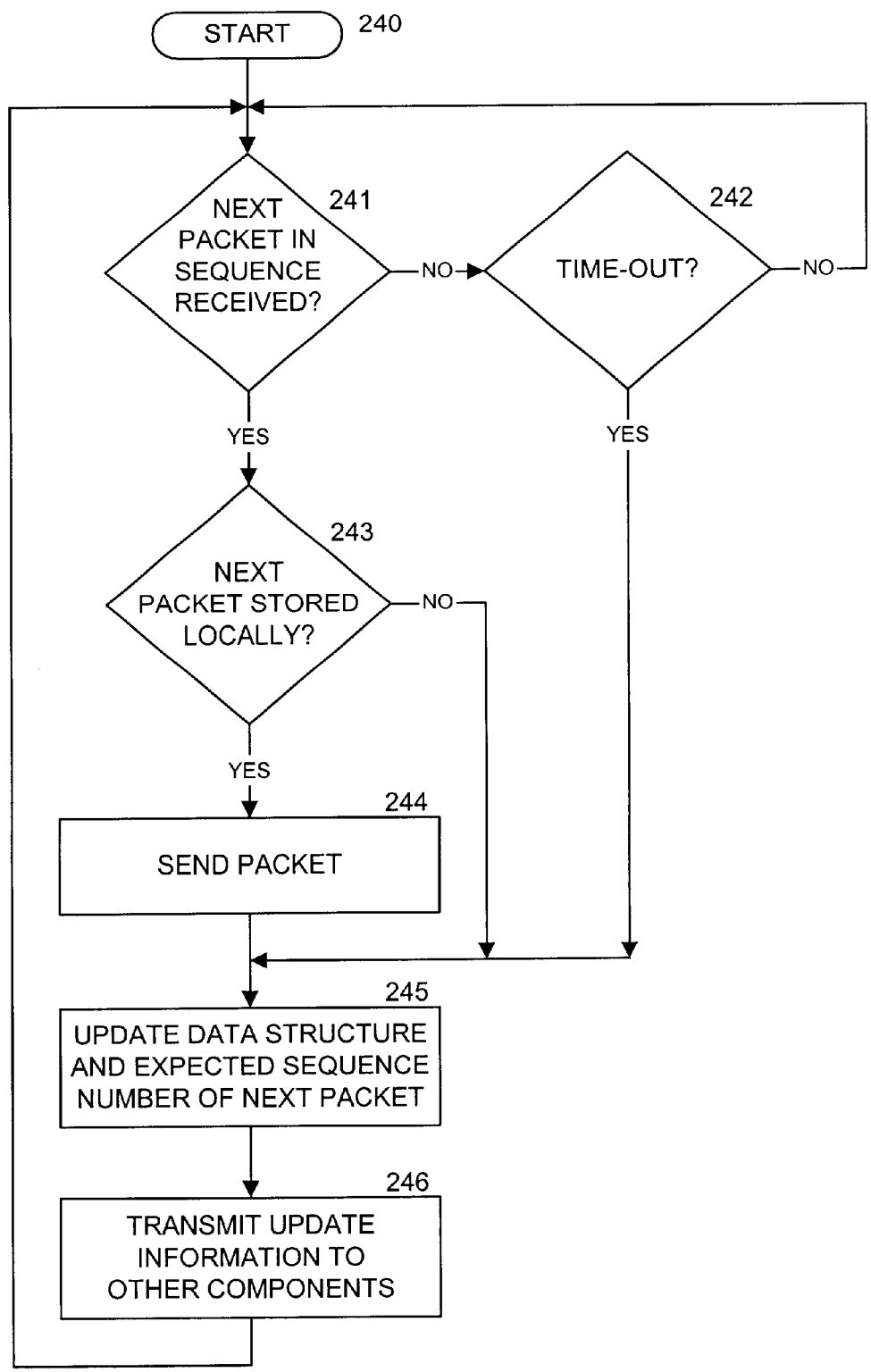

FIGS. 2C–2E illustrate processes for distributed resequencing of a stream of packets in one embodiment. Three separate flow diagrams are presented for one embodiment which performs these tasks in parallel, while other embodiments may use other approaches in keeping within the scope and spirit of the invention. Once again, these processes could be used to simultaneously resequence and/or reassemble one or more streams of packets.

Processing of the flow diagram of FIG. 2C begins at process block 220, and proceeds to process block 222, wherein one or more packets are received and stored by a distributed resequencing component. When used in the context of packet reassembly, some disassembly device subdivides packets into smaller sized packets to be sent through the network. In addition, some distribution mechanism, such as a network, switching fabric or other device, sends packets of a particular sequenced stream in a manner that results in two or more distributed resequencing and/or reassembly components each receiving one or more packets from the particular stream. Next, in process block 224, indicators of the received and stored packets are added to a resequencing data structure in which the indicators are typically maintained in a sequential order based on a sequence number (or timestamp, etc.) contained in each of the received packets. One embodiment uses a ring buffer data structure with a current sequence number associated with the current position within the ring buffer, and the indicators are inserted in the ring buffer in a determined position based on a difference between the current sequence number and the sequence number of the packet. Next, in process block 226, update information is transmitted to the other components. In other embodiments, update information is sent after a predetermined timeout period which allows a block of update information to be accumulated and sent at the same time. This timeout period could be determined, inter alia, based on a time value, a number of packets received, or a volume of update information. Processing then returns to process block 222 to receive and store more packets.

Processing of the flow diagram of FIG. 2D begins at process block 230, and proceeds to process block 232, wherein one component receives an data structure update message from another component. This update message notifies the component that another component has received one or more packets having a particular set of sequence numbers. Next, in process block 234, the component updates its data structure to indicate that another component has received a packet having a particular sequence number. Processing returns to process block 232 to receive more update messages.

FIG. 2E provides a flow diagram for one embodiment of a process for generating a stream of resequenced packets (in conjunction with the processes described in FIGS. 2C–D.) Processing of the flow diagram of FIG. 2E begins at process block 240, and proceeds to process block 241. If the next packet in the sequence has been received (and stored) by any of the distributed resequencing components as determined in process block 241, and if this next packet is stored locally as determined in process block 243, then this next packet is sent in process block 244 over the link in a coordinated, multiplex fashion to produce the resequenced stream of packets. Otherwise, if the next packet in the sequence has not been received as determined in process block 241, and if the distributed resequencing components have waited too long for this next packet, a time-out condition has resulted and process block 245 is performed, otherwise, processing returns to process block 241. In process block 245, the data structure and expected sequence number of the next packet are updated to account for any sent packet, packet stored in another component, or timed-out packets. Next, in process block 246, an update information message is sent to the other components to notify them of changes to the local data structure and/or expected next sequence number. Additionally, in one embodiment, these update messages are used to help synchronize the timing of packets sent by distributed components. Processing then returns to process block 241.

Figure 2F:
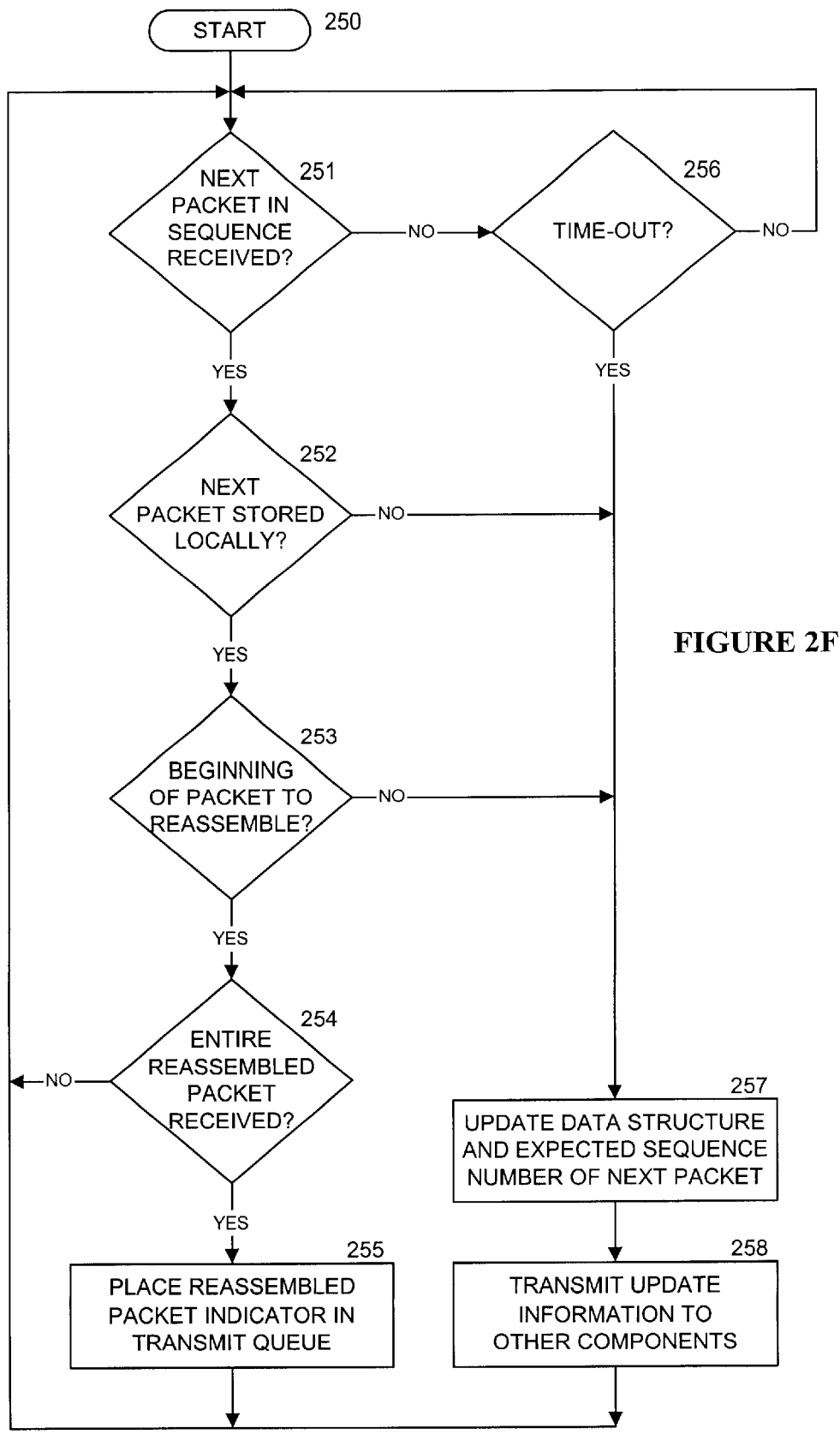
Figure 2G:
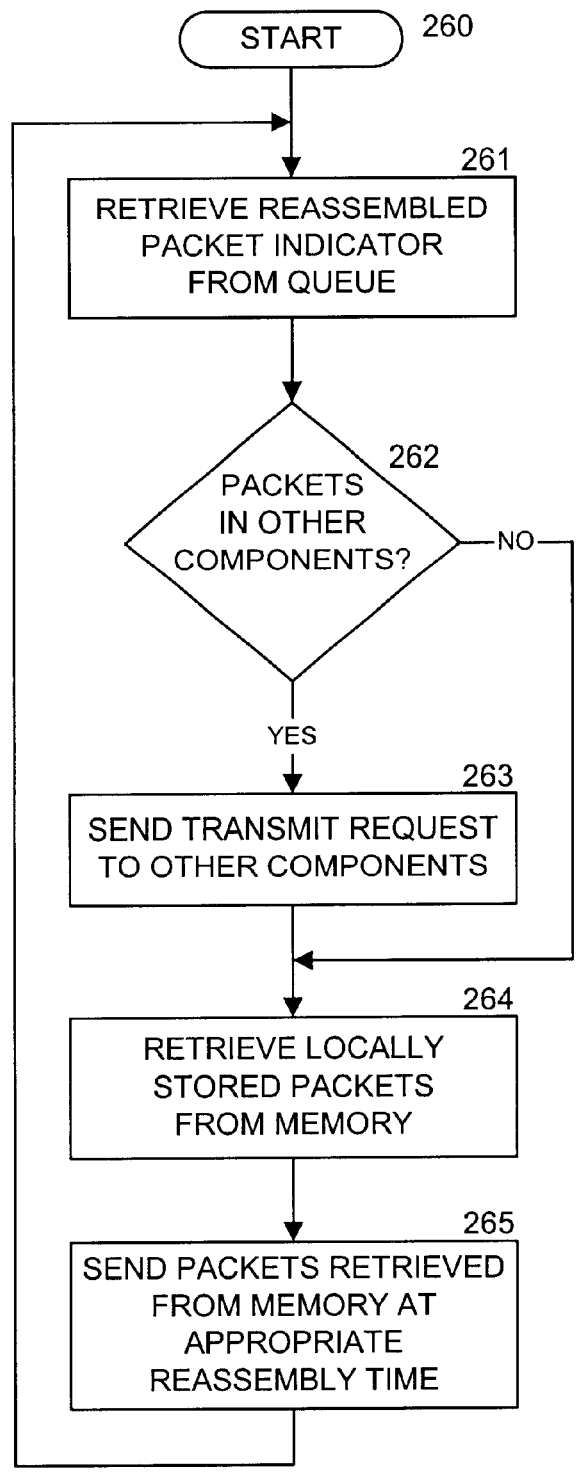
Figure 2H:
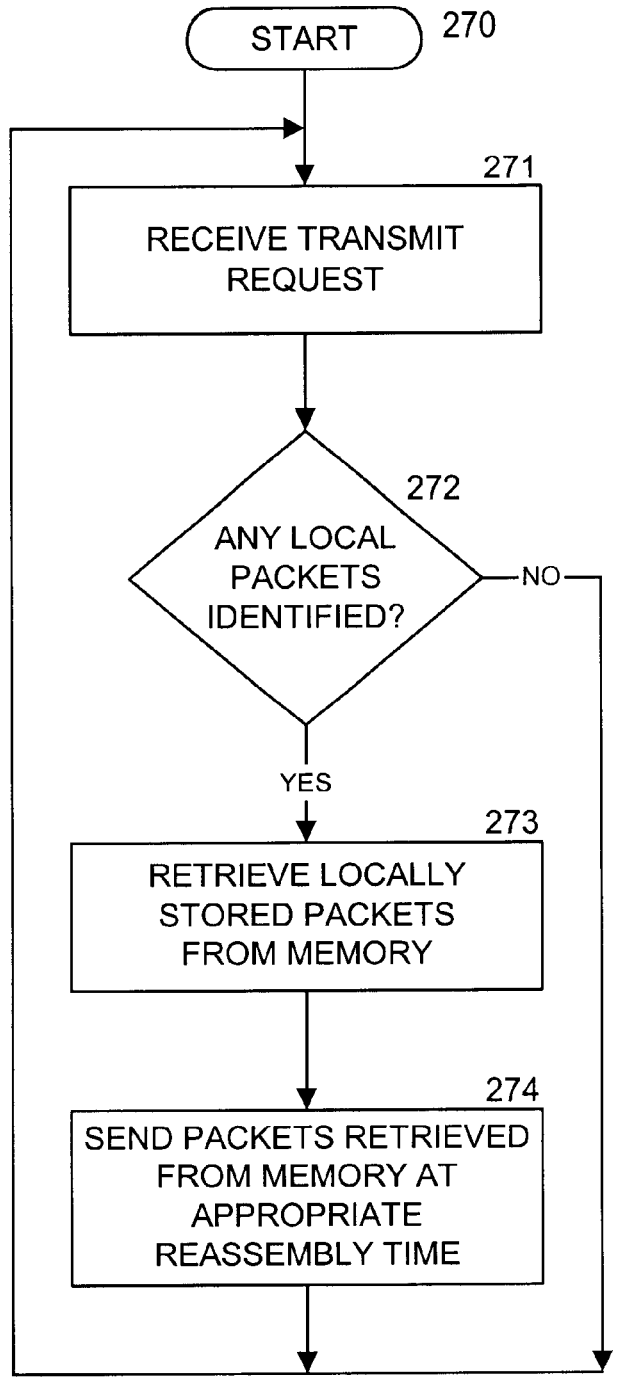

FIGS. 2F–H provide flow diagrams for one embodiment of a process for generating a stream of resequenced and reassembled packets (in conjunction with the processes described in FIGS. 2C–D.) Processing of the flow diagram of FIG. 2F begins at process block 250 and proceeds to process block 251. If the next packet in the sequence has been received (and stored) by any of the distributed resequencing and reassembly components as determined in process block 251, and if this next packet is stored locally as determined in process block 252 and the packet corresponds to a first packet in a series of packets to be reassemble as determined in process block 253, processing proceeds to process block 254. As determined in process block 254, if the entire packet has been received by one or more of the distributed resequencing and reassembly components, then in process block 255 an indicator of the packet to be reassembled is placed in a transmit queue in anticipation of a coordinated sending and reassembly of the packets comprising the larger packet; otherwise processing returns to process block 251. If there has been a time-out waiting for a packet as determined in process block 256, the next packet is not stored locally as determined in process block 252, or the packet is not the first packet of a series of packets to be reassembled in process block 253, then the data structure and expected next sequence number are updated in process block 257. Next, in process block 258, an update information message is sent to the other components to notify them of changes to the local data structure and/or expected next sequence number. Additionally, in one embodiment, these update messages are used to help synchronize the timing of packets sent by distributed components. Processing then returns to process block 251.

The flow diagram of FIG. 2G illustrates a process of one embodiment for removing an indicator from a queue and commencing the reassembly and sending of the packet. Processing begins at process block 260, and proceeds to process block 261, wherein an indicator is removed from a queue for sending a particular packet. Embodiments of the invention provide for various techniques for queuing, scheduling, and removing packets from a queue. Some of these techniques are commonly used in routers, computers, and packet switching systems. Next, if packets comprising the reassembled packet are stored in other distributed resequencing and reassembly components as determined in process block 262, then one or more transmit requests for these other packets are sent to the other components in process block 263. In one embodiment, these transmit request messages are used to help synchronize the sending of packets comprising the resequenced packet by the other components. Next, in process block 264, the one or more packets stored locally from memory are retrieved. Next, in process block 265, the packets retrieved from memory are sent at the appropriate time to multiplex the packet over a link or bus to generate the reassembled packet. In another embodiment, the packets are sent to a reassembly device with then compiles the packets comprising the reassembled packet, and sends out the reassembled packet. Processing then returns to process block 261.

The flow diagram of FIG. 2H illustrates a process of one embodiment for a component which does not contain the first packet in a series of packets to be compiled into the reassembled packet. Processing begins at process block 270, and proceeds to process block 271 wherein a transmit request message is received. If any of the local packets identified by the received transmit request message are stored locally as determined in process block 272, then these locally stored packets are retrieved from memory in process block 273. Next, in process block 274, the packets retrieved from memory are sent at the appropriate time to multiplex the packet over a link or bus to generate the reassembled packet. In another embodiment, the packets are sent to a reassembly device with then compiles the packets comprising the reassembled packet, and sends out the reassembled packet. Processing then returns to process block 271.

FIG. 3 illustrates one embodiment of a mechanism for distributed resequencing and reassembly of packets in the context of a packet switching system 300. In this exemplary embodiment, packets are distributed by a packet switch 301, such as an eight plane packet switch, to four distributed resequencing and reassembly components 303A–D. In one embodiment, each of two planes of the packet switch 301 are connected to one of the distributed resequencing and reassembly components 303A–D over links 302A–H. Distributed resequencing and reassembly components 303A–D communicate and coordinate the resequencing and reassembly operations over ring 304A–D. In a coordinated fashion, distributed resequencing and reassembly components 303A–D send packets on packet merge bus 305B–E to produce the resequenced and reassembled packets. The operation of a distributed resequencing and reassembly components 303A–D are further described in relation to FIGS. 4A–D, 5–8.

Figure 4A:
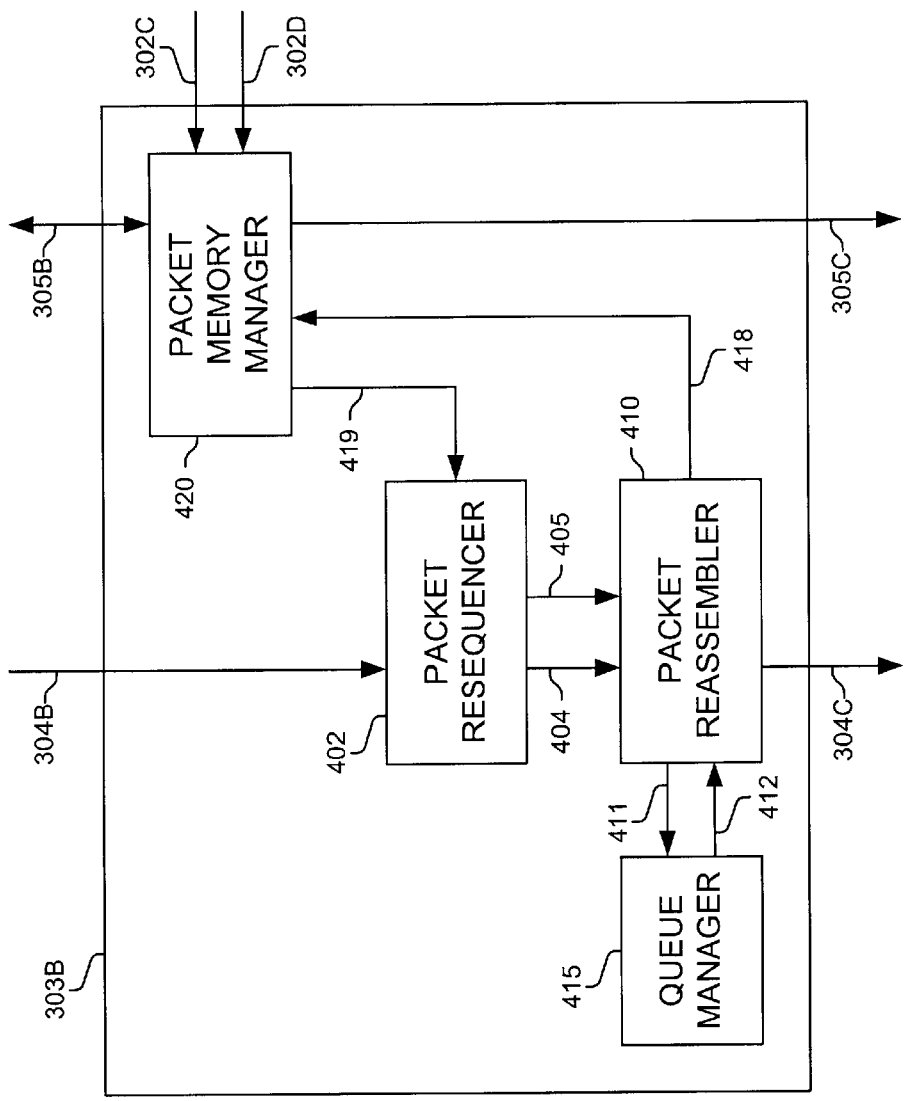
FIG. 4A is a block diagram of one embodiment of a distributed resequencing and reassembly element.
Figure 4B:
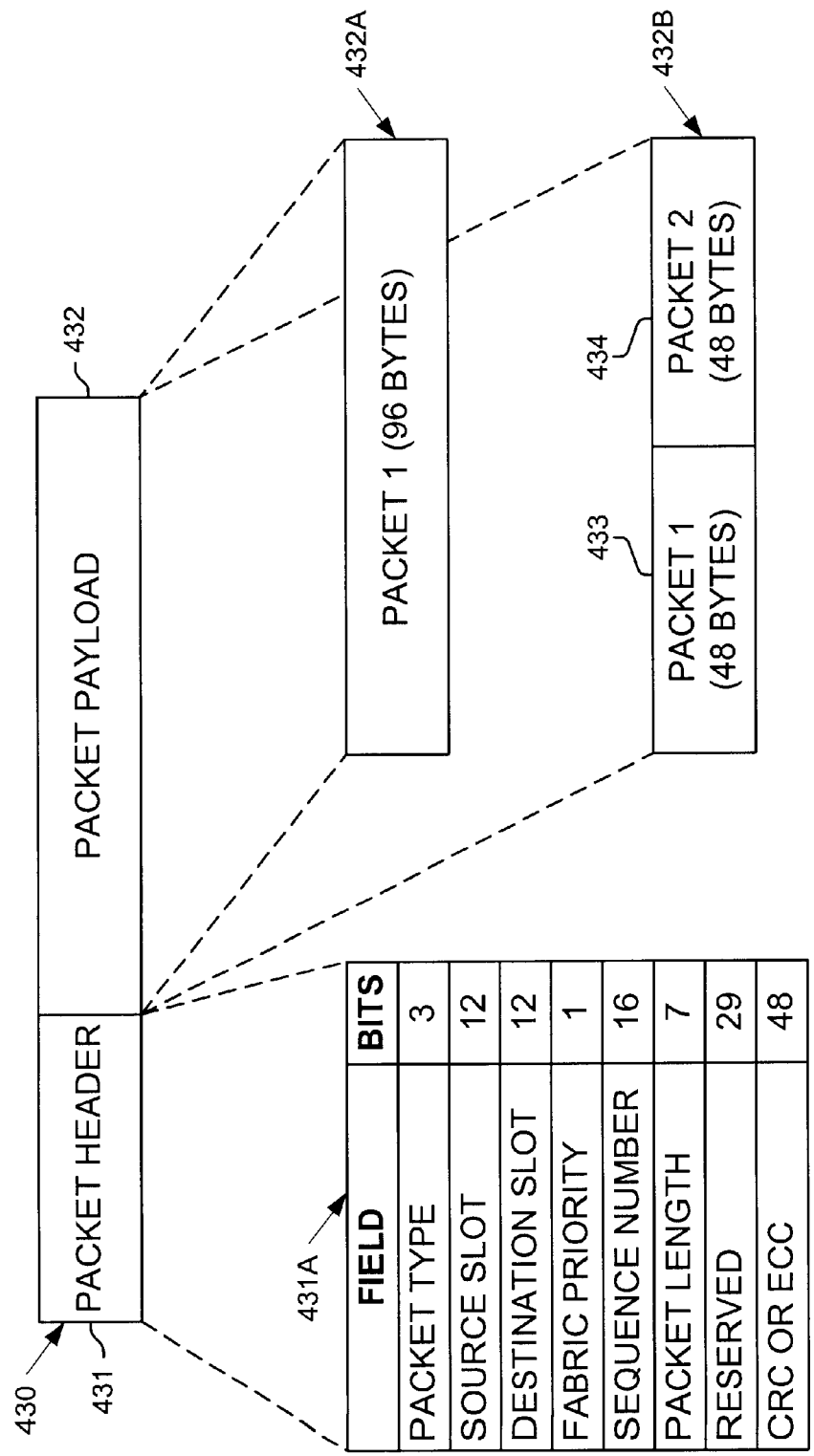
FIG. 4B illustrates an exemplary packet format used in one embodiment.
Figure 4D:
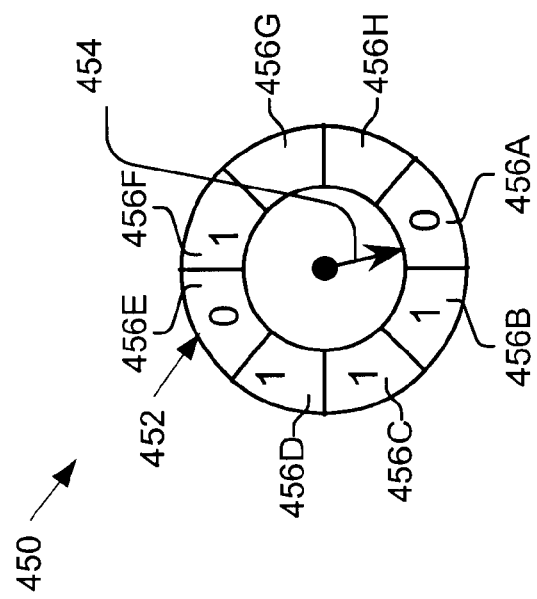

One embodiment of distributed resequencing and reassembly component 303B (FIG. 3) is shown in FIG. 4A. Packets are received by the packet memory manager over links 302C–D from the packet switch 301. An exemplary format of such packets is illustrated in FIG. 4B. A packet 430 includes a cell header 431 and cell payload 432. The cell header has various fields, including a packet type, source, destination, fabric priority, sequence number, packet length, reserved field, and cyclic redundancy check or error-correcting code value as illustrated in table 431A. The packet payload 432 may contain part or all of one or two packets (e.g., a single 96 byte packet 432A or two 48 byte packets 433–434) in a payload 432B. Of course, FIG. 4B illustrates one of numerous packet formats which may be in embodiments of the invention.

Packet memory manager 420 maintains the packet payloads and sends the received packet headers to the packet resequencer 402 over link 419. In addition, packet memory manager 420 receives a data structure representing a reassembled packet from packet reassembler 410 over link 418. Packet memory manager then retrieves from memory any packet payloads stored locally corresponding to the reassembled packet. Each of the distributed resequencing and reassembly components 303A–D places packets on the packet merge bus 305B–305E to generate the reassembled packet, which is sent out packet merge bus 305E to another component or device.

Figure 7:
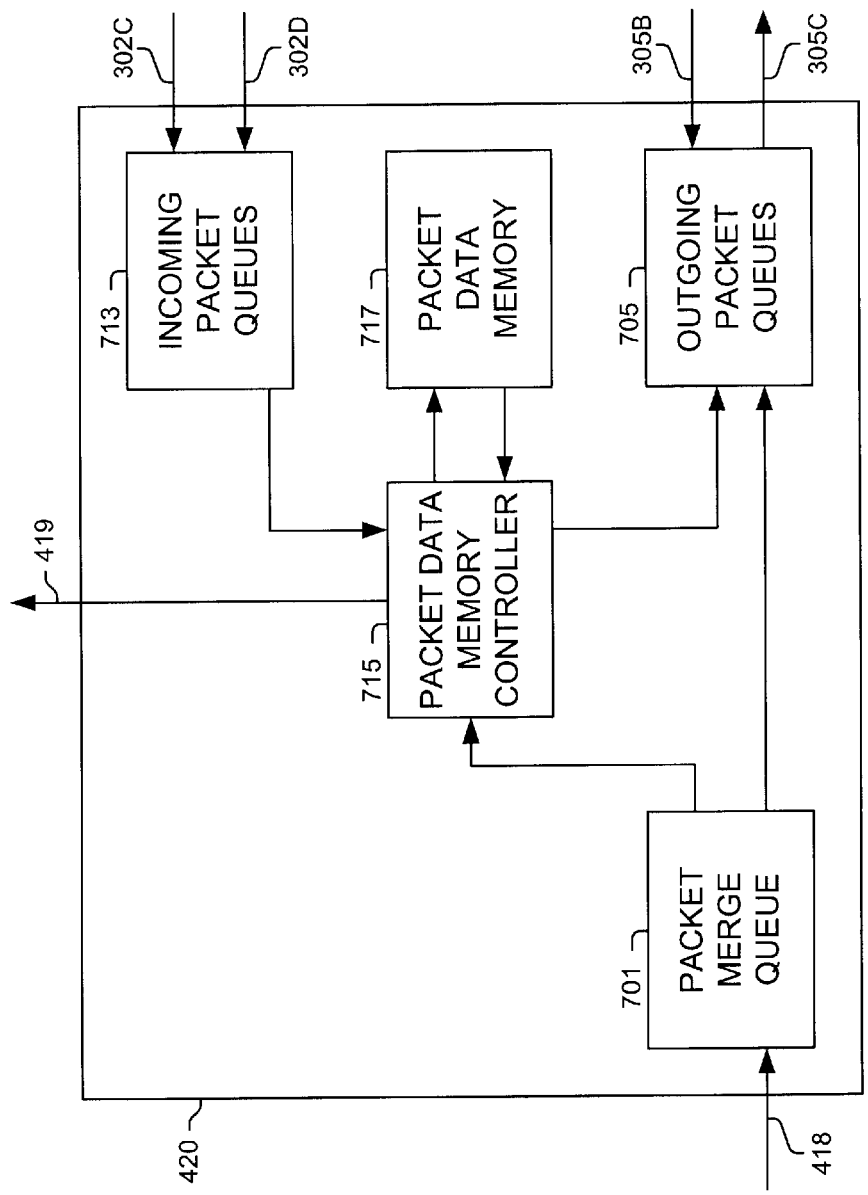
FIG. 7 is a block diagram of one embodiment of a packet memory manager.
Figure 8:
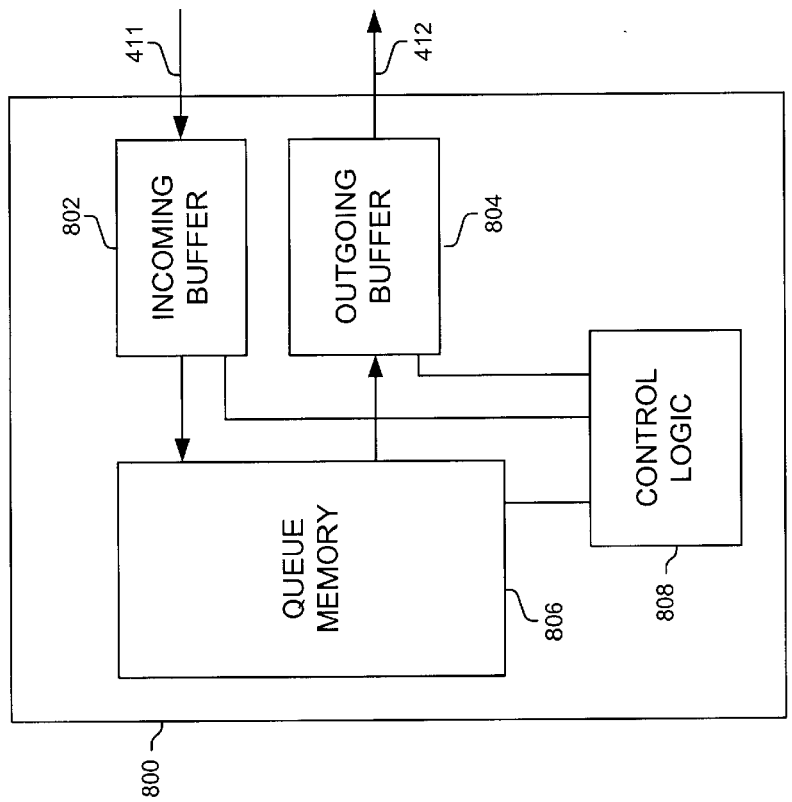
FIG. 8 is a block diagram of one embodiment of a queue manager.

The operation of one embodiment of packet memory manager 420 is illustrated in FIG. 7. Incoming packets are received on links 302C–D and placed in incoming packet queues 713. Packets are then removed from incoming packet queues 713 and sent to the packet data memory controller 715. The packet payloads are then stored in packet data memory 717. The packet headers are simultaneously sent by packet data memory controller 715 over link 419 to packet resequencer (FIG. 4A). The operation of the other elements of packet memory manager 420 will be described hereinafter in relation to the packet merge process.

Packet resequencer 402 receives these packet headers and operates in conjunction with the packet resequencers of the other distributed resequencing and reassembly components 303A,C–D. In one embodiment, packet resequencer 402 uses a local and a global data structures to resequence packets.

FIG. 4C illustrates one embodiment of these data structures. A local data structure 440 is used to identify packets which are received and locally stored. Local data structure 440 may take the form of a ring buffer 442 with a current position pointer 444 which is updated using the current sequence number. Ring buffer 442 could be implemented using a linked list, array, or other data structure format. Ring buffer 442 has numerous buckets 443A–H (only eight are shown for illustration convenience) with the number of buckets typically related to the size of the out of order window. An example of an bucket entry 447 includes a packet header field 448 and payload pointer field 449. The packet header field 448 will contain the received packet header fields, and the payload pointer points to the corresponding packet payload 449 stored in the packet memory manager 420. Newly received packet headers are placed in local data structure 440 at a bucket position offset from the current position pointer 444 based on the sequence number of the received packet header and the sequence number corresponding to the current position pointer 444.

A global data structure 450 is used to identify packet headers which are stored in any of the distributed resequencer and reassembly components 303A–D (or at least the other distributed resequencer and reassembly components 303A,C–D as the locally stored packet headers are identified in local data structure 440). Global data structure 450 may take the form of a ring buffer 452 with a current position pointer 454 which is updated using the current sequence number. Ring buffer 452 could be implemented using a linked list, array, or other data structure format. Ring buffer 452 has numerous buckets 453A–H (only eight are shown for illustration convenience) with the number of buckets typically related to the size of the out of order window. In one embodiment, each of the buckets 453A–H contains a binary flag to represent whether a corresponding packet header is stored in any of the distributed resequencer and reassembly components 303A–D (or at least the other distributed resequencer and reassembly components 303A,C–D).

Packet resequencer 402 coordinates its activities with the packet resequencers via the communication ring 304B, 404, 304C, and packet reassembler 410 communicates with the other packet reassembler over this ring 304B, 404, 304C. Periodically, packet resequencer 402 sends global update information to the other packet resequencers to identify the packet headers stored locally. Referencing the local and global data structures 440, 450 (FIGS. 4C–D) to determine what packets have been received by the distributed resequencing and reassembly components 303A–D (FIG. 3), packet resequencer 402 can produce a stream of resequenced packet headers over link 405 to packet reassembler 410.

Figure 5:
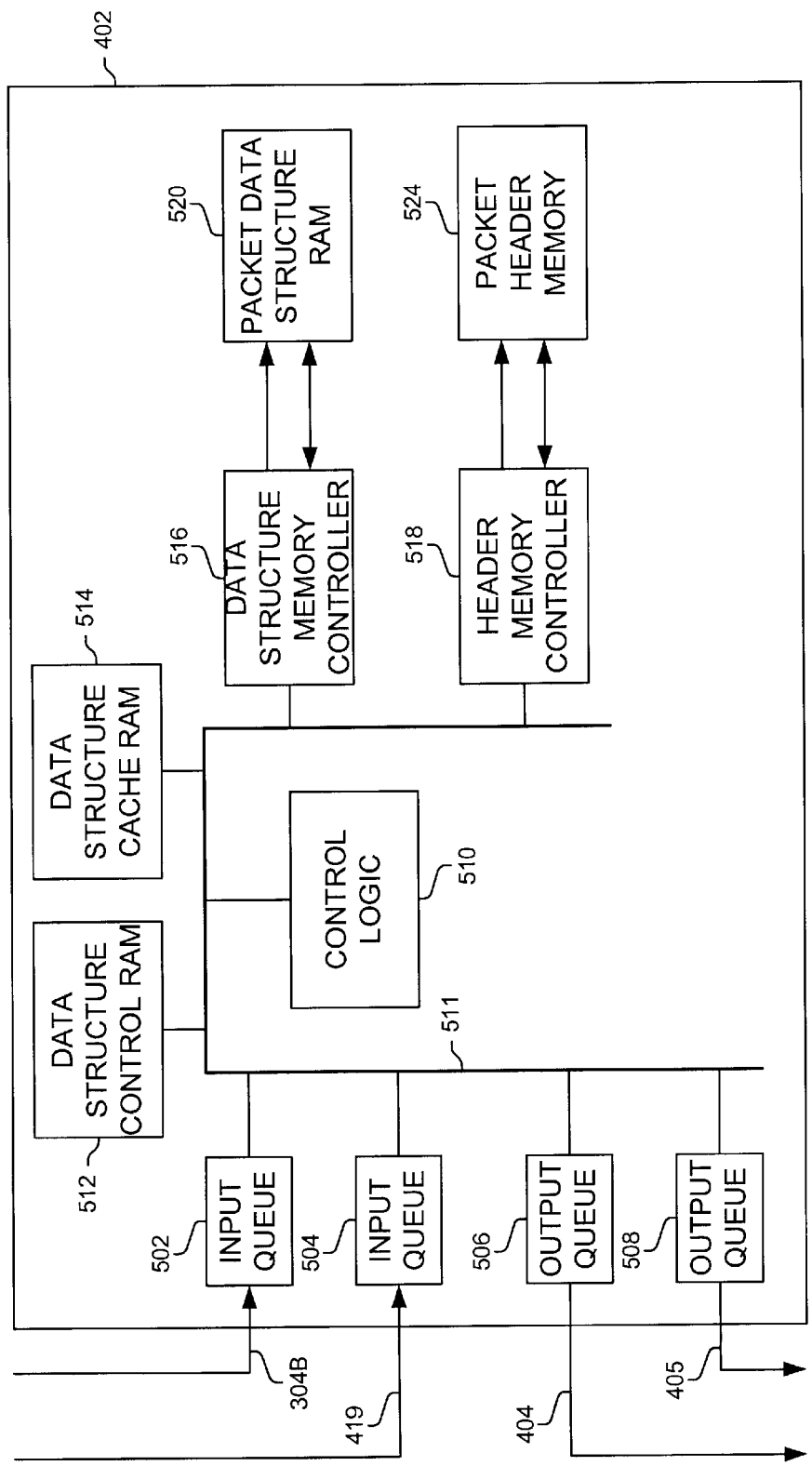
FIG. 5 is a block diagram of one embodiment of a packet resequencer.

One embodiment of packet resequencer 402 is further described in relation to FIG. 5. The operation of packet resequencer 402 is controlled by control logic 510 which is interconnected with other elements via communications link 511. Embodiments of communications link 511 include most any communications mechanism, such as, but not limited to a bus, fully connected mesh, point-to-point links, etc. Control logic 510 process cell resequencing, stores and computes new resequencing state information based on information updates received from other distributed resequencer and reassembly components 303A,C–D, and sends updates to other distributed resequencer and reassembly components 303A,C–D.

Update messages representing the packets stored in the other distributed resequencer and reassembly components 303A,C–D are received over ring 304B and placed in input queue 502, and outgoing update messages are placed in output queue 506 and sent out over link 404. The local and global data structures 440, 450 (FIGS. 4C–D) are updated and stored in data structure cache RAM 514. In one embodiment, 8192 resequencing operations are simultaneously performed, with each resequencing stream allocated thirty two entries. Data structure control RAM 512 is used to reflect the current state of the packet resequencing. Packet header information is stored in packet header memory 524, which is controlled by header memory controller 518. Additional resequencing local and global data structures are stored in packet data structure RAM 520, which is controlled by data structure memory controller 516. Data structure memory controller 516 performs memory clear, prefetch and update operations requested by control logic 510. Referencing the maintained local and global data structures 440, 450 (FIGS. 4C–D) to determine what packets have been received by the distributed resequencing and reassembly components 303A–D (FIG. 3), packet resequencer 402 produces a stream of resequenced packet headers which are placed in output queue 508 and sent in order over link 405 to packet reassembler 410.

An alternative packet sequence numbering scheme is possible which typically reduces the complexity of resequencing and possibly adds some complexity at the segmentation source. This method requires each source to use the same sequence number for packets sent on each plane to the same destination. The sequence number is only incremented once a packet has been sent to each plane. Typically, the order in which packets are sent to planes is fixed and when a flow restarts it must resume sending packets to the plane after the one use to send the previous packet to that destination. The advantage this offers resequencing is each resequencing engine which manages n planes now has deterministic gap in the reassemblies (i.e., it can automatically infer what cells are going to be received by the other resequencing engines in the system). The amount of state that needs to be communicated between resequencing elements is reduced.

Packet reassembler 410 receives the stream of ordered packets over link 405 and allocates and fills data structures of reassembled packets. When this reassembly process is distributed among the distributed resequencing and reassembly components 303A–D, each of the packet assemblers must communicate and coordinate with each other. When a particular packet reassembler, such as packet reassembler 410, receives a packet header indicating the beginning of a packet to be reassembled, then the particular packet reassembler allocates a data structure with enough room for the entire reassembled packet. Because the reassembly process is distributed, the particular packet reassembler broadcasts a message to the other packet reassemblers which respond indicating if they have received the other packets comprising the packet to be reassembled.

When all these sub-packets have been received by one or more of the distributed packet reassemblers, this information is communicated to the particular packet reassembler holding the head of the packet. The data structure is then forwarded over link 411 to the corresponding queue manager, such as queue manager 415, to store the information in a queue corresponding to the destination of the reassembled packet. The operation of one embodiment of queue manager 415 is further described in relation to FIG. 8. Queue manager 415 receives the description of the reassembled packet, temporarily stores it in the incoming buffer 802, and then stores it in queue memory 806 in a queue based on its destination (and possibly priority and/or class of service). At the appropriate time, as determined by control logic 808, the queue manager extracts from one of its queues a data structure describing the corresponding reassembled packet to be send from the distributed resequencing and reassembly component 303B, and places it in outgoing buffer 804, which is then forwarded back to packet reassembler 410 over link 412.

Packet reassembler 410 receives a pointer to the data structure reflecting the reassembled packet from queue manager 415. The information in this data structure is forwarded to packet memory manager 420. Packets comprising the reassembled packet are placed on the packet merge bus 305B–E at the appropriate time to generated the reassembled packet out packet merge bus 305E.

Figure 6:
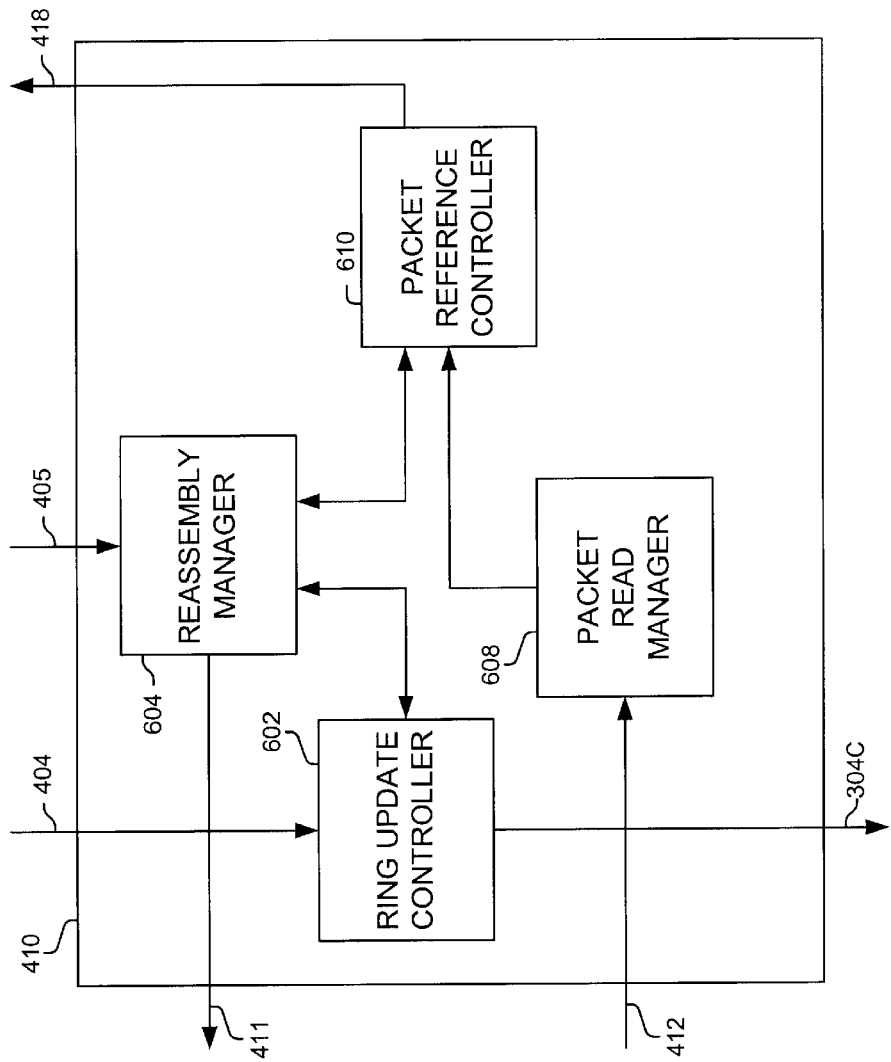
FIG. 6 is a block diagram of one embodiment of a packet reassembler.

The operation of one embodiment of packet reassembler 410 is further described in relation to FIG. 6. A stream of resequenced packet headers is received over link 405 by reassembly manager 604. If a received packet header is the first sub-packet of a packet, a new packet descriptor is requested from packet reference controller 610. This packet descriptor is sent, via reassembly manager 604, to the ring update controller 602 which forwards it to the other reassembly managers. If the packet header received is not the first sub-packet of a packet and there is no valid packet descriptor allocated for this packet, reassembly manager 604 waits until it receives a packet descriptor from ring update controller 602, which receives the valid packet descriptor from one of the other reassembly managers 604 in the system. Once there is a valid packet descriptor allotted for the packet, a sub-packet descriptor from the packet header is written into a packet descriptor data structure in reassembly manager 604. When the last sub-packet of a packet is received by reassembly manager 604, this information is sent to the ring update controller 602 which forwards it to the other reassembly managers 604 in the system.

The reassembly manager 604 that received the head of a packet sends the packet descriptor to the queue manager on link 411 when it receives the last sub-packet of the packet or when it receives a message from ring update controller 602 indicating that one of the other reassembly managers 604 has received the last sub-packet of the packet.

The reassembly manager 604 that received the head of a packet sends the packet descriptor to queue manager 800 over link 411 when it receives the last sub-packet of the packet or when it receives a message from ring update controller 602 indicating that one of the other reassembly managers 604 has received the last sub-packet of the packet.

When a queue manager 800 performs a de-queue operation, the packet descriptor is broadcast to all packet reassemblers 410 via ring update controller 602. Packet read manager 608 buffers these descriptors and forwards them to packet reference controller 610. Packet reference controller 610 reads the packet descriptor and sends a stream of sub-packet descriptors to packet memory manager 420 (FIG. 7) over link 418. Once all the sub-cell descriptors are sent, these packet descriptors are freed for reuse.

With regards to FIG. 7, packets arrive on links 302C–D and are temporarily stored in incoming packet queues 713. Packets are forwarded from incoming packet queues 713 to packet data memory controller 715. Packet data memory controller 715 allocates memory for the packet, stores the packet in packet data memory 717, and forwards the packet header which contains a pointer to the packet to resequencing engine 402 (FIG. 5) over link 419.

When packets are de-queued, a stream of packet descriptors arrive at packet merge queue 701 over link 418. Packet merge queue 701 forwards the packet pointers to packet data memory controller 715 which reads the packet out of packet data memory 717 and forwards it to the outgoing packet queues 705. Packet merge queue 701 also forwards the packet descriptor to outgoing packet queues 705. Reassembled and partially reassembled packets arrive at outgoing packet queues 705 on link 305B. Each packet has a sequence number associated with it, and if a packet in outgoing packet queues 705 has a sequence number with a lower value, it is sent out on link 305C before the incoming packet. Otherwise, the incoming packet is passed through.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A system for resequencing and reassembling of a stream of packets comprising:
    a plurality of distributed resequencing and reassembly components, each of the plurality of distributed resequencing and reassembly components including one or more data structures for maintaining an indication of packets of the stream of packets that are stored in other distributed resequencing and reassembly components of the plurality of distributed resequencing and reassembly components, wherein each of the plurality of distributed resequencing and reassembly components includes a resequencing mechanism for resequencing a subset of the stream of packets received by said each of the plurality of distributed resequencing and reassembly components;
    a communications mechanism coupled to the plurality of distributed resequencing and reassembly components to allow communication among the distributed resequencing and reassembly components; and
    one or more packet merging mechanisms coupled to the plurality of distributed resequencing and reassembly components to receive packets of the stream of packets to produce a resequenced and reassembled stream of the stream of packets.

2. The system of claim 1, wherein the resequencing mechanism of a particular distributed resequencing and reassembly component references the one or more data structures to determine if a next packet in a particular sequence may be stored in a different distributed resequencing and reassembly component of the plurality of distributed resequencing and reassembly components.

3. The system of claim 1, further comprising a distributor for distributing the stream of packets to the plurality of distributed resequencing and reassembly components.

4. The system of claim 2, wherein the distributor includes a plurality of paths through a packet switching system.

5. The system of claim 1, wherein the communications mechanism includes a communication ring or bus.

6. The system of claim 1, wherein the one or more packet merging mechanisms includes a packet merge bus.

7. A packet switching system including the system of claim 1.

8. A router including the system of claim 1.

9. The system of claim 1, wherein each of the plurality of distributed resequencing and reassembly components includes a packet resequencer and a packet reassembler.

10. The system of claim 9, wherein each of the plurality of distributed resequencing and reassembly components further includes a queue manager.

11. The system of claim 9, wherein each of the plurality of distributed resequencing and reassembly components further includes a packet memory manager.

12. A system for resequencing and reassembling a stream of packets comprising:
    a plurality of means for resequencing and reassembling the stream of packets, each of the plurality of means for resequencing and reassembling the stream of packets including a data structure means for indicating which packets of the stream of packets are located in other of the plurality of means for resequencing and reassembling the stream of packets;
    a communications means coupled to the plurality of means for resequencing and reassembling the stream of packets; and
    a merging means for receiving packets from the plurality of means for resequencing and reassembling the stream of packets and for producing a resequencing and reassembling stream of the stream of packets.

13. The system of claim 12, further comprising a packet switching means, connected to the plurality of means for resequencing and reassembling the stream of packets, for distributing packets of the stream of packets to the plurality of means for resequencing and reassembling the stream of packets.

14. The system of claim 12, wherein each of the means for resequencing and reassembling the stream of packets includes a local data structure means for maintaining an indication of the packets stored locally within a particular means for resequencing and reassembling the stream of packets.

15. A method performed by a particular component of a plurality of resequencing and reassembly components to reassembling a larger packet packetized into a plurality of smaller packets within a stream of packets, the method comprising:
    receiving a first set of the packets of the stream of packets, the first set of packets including a first packet of the plurality of smaller packets;
    resequencing the first set of packets;
    receiving an indication of a second set of packets of the stream of packets received by a second component of the plurality of components, the indication of the second set of packets identifying at least a second packet of the plurality of smaller packets; and
    sending the first packet over a communications media in coordination with at least one other component of the plurality of components of which the second component is a member to generate the larger packet.

16. The method of claim 15, further comprising resequencing the received first set of packets into an original order of the stream of packets.

17. The method of claim 16, wherein resequencing the received first set of packets includes: maintaining one or more data structures indicating the first and second sets of packets and one or more current position indications within the one or more data structures.

18. The method of claim 16, further comprising placing a reassembled packet indication in a queue, the reassembled packet indication including a representation of the first packet; and removing the reassembled packet indication from the queue.

19. The method of claim 18, wherein the reassembled packet indication further includes a second representation of the second packet.

20. The method of claim 18, wherein the first packet is the first in the resequencing order of the smaller packets.

21. The method of claim 15, wherein the first packet is not the first in the resequencing order of the smaller packets.

22. The method of claim 15, further comprising receiving a transmit request from the second component, wherein sending the first packet is performed in response to receiving the transmit request.

23. The method of claim 15, further comprising in response to recognizing the first packet is the first in the resequencing order of the smaller packets, sending a transmit request to at least the second component of the plurality of components.

24. The method of claim 15, wherein the indication of the second set of packets is received over a communications ring or bus.

25. The method of claim 15, wherein each of the packets of the stream of packets is identified with a sequence identifier.

26. The method of claim 25, wherein the sequence identifier is a sequence number or a timestamp value.

27. The method of claim 15, further comprising storing the first packet on a storage device or in a memory; and retrieving the first packet from the storage device or the memory.

28. A packet switching system performing the method of claim 15.

29. A router performing the method of claim 15.

30. A computer system performing the method of claim 15.

* * * * *